Dec. 26, 1933.    W. F. PUNTE    1,941,047
CONTAINER FOR SPOOLS
Filed Feb. 12, 1931
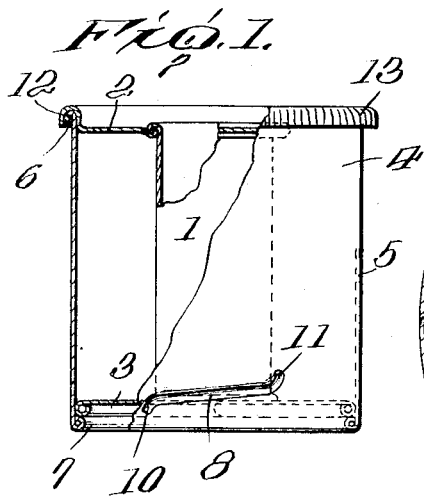
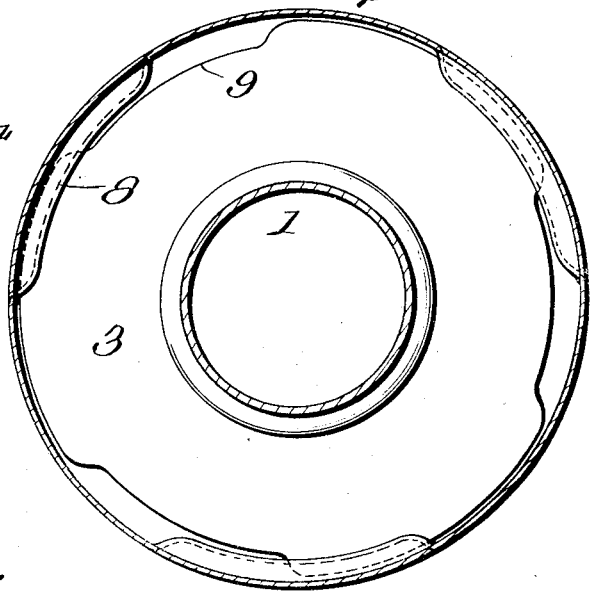
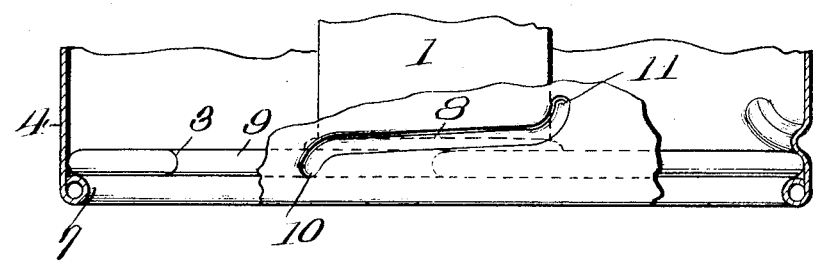
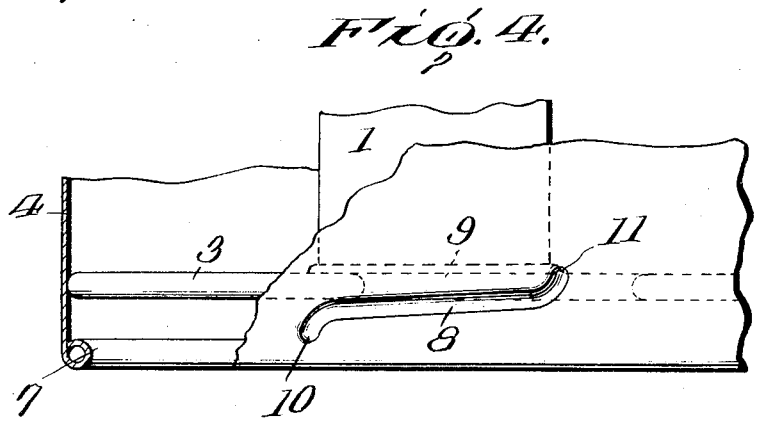
Inventor
William F. Punte
By Sturtevant Mason & Porter
Attorneys Patented Dec. 26, 1933

1,941,047

UNITED STATES PATENT OFFICE 1,941,047

CONTAINER FOR SPOOLS

William F. Punte, Syracuse, N. Y., assignor to Continental Can Company, Inc., New York, N. Y., a corporation of New York Application February 12, 1931. Serial No. 515,305

1 Claim. (Cl. 206—52)

The invention relates to a container for spools, and more particularly to a spool for adhesive tape and the like.

An object of the invention is to provide a container for housing the spool, which container and spool are formed with cooperating members brought into engagement with each other by turning the spool relatively to the container for securing the spool in the container.

A further object of the invention is to provide a container for a spool of the above character wherein the outer flange of the spool is extended to overlie the wall of the container and provide means which can be gripped for turning the spool in the container.

A still further object of the invention is to provide a container and spool of the above type wherein the extended portion of the flange is curved to receive a bead at the outer end of the container wall, while the other end of said wall carries an inwardly projecting shoulder against which the inner flange of the spool is pressed.

These and other objects will in part be obvious and will in part be hereinafter more fully described.

In the drawing:—

Figure 1 is a view partly in section and partly in front elevation showing the spool locked into the container;

Fig. 2 is a bottom plan view of the spool and the container;

Fig. 3 is an enlarged sectional view of the spool and the container showing in detail the locking rib in engagement with the bottom flange of the spool, and Fig. 4 is a view similar to Fig. 3 showing the parts released from their locking engagement.

The invention is directed broadly to a container for spools of adhesive tape and the like. The spool is preferably of metal and includes a central core carrying end flanges. The container is also of metal and consists of a cylindrical body portion adapted to receive and house the spool. Means for positively locking the spool in the container are provided in the form of spaced inwardly projecting inclined ribs struck up in the wall of the body portion. These ribs coact with spaced projecting lugs carried by one of the spool flanges so that when the spool is placed in the container and given a slight turn a positive locking of the spool in the container is accomplished. As may be readily seen from the drawing, the outer flange of the spool is adapted to overlie a bead at the outer end of the container wall and is knurled to facilitate easy turning. The other end of the container wall carries an inwardly projecting bead which acts as a limiting stop for the inner flange of the spool.

Referring more in detail to the drawing, a core 1 is provided with end flanges 2 and 3. These flanges are attached to the core in any well known manner as by a seam as illustrated in the drawing. A metal container 4 is provided to house the spool. This container consists of a cylindrical body portion 5 which is curled outwardly at the upper end thereof into a bead 6 and inwardly at the lower end thereof into an inturned bead 7. This lower bead 7 acts as a limiting stop for the lower flange 3 of the spool when the spool and the container are assembled. Spaced at intervals in the wall of the container body are struck up inwardly projecting inclined ribs 8. These ribs are adapted to coact with spaced lugs 9 carried by the lower spool flange to lock the spool in the container when the spool is given a slight turn. It will be noted that the lower end of these ribs are downwardly curved as indicated at 10 so that they will contact with the inwardly turned bead 7 to act as a limiting stop for the spool in the container. The upper end of these ribs are curved upwardly as shown at 11 so as to allow the lug 9 of the lower flange to slip under the rib when the spool is turned for locking.

It will be noted that the upper flange 2 of the spool has a curled portion 12 which is adapted to overlie the bead 6 at the upper end of the body portion so that when the spool is locked into the container a practically air-tight seal for the adhesive tape is provided. This flange 12 may be knurled as indicated at 13 to facilitate the easy turning of the spool for locking or unlocking the same.

From the above structure it will be apparent that the spool is firmly locked within the housing, and this is accomplished without in any way covering the flanges on the spool which may be decorated in any desired way and which will be exposed to view. Furthermore, the overlying portion on the upper flange together with the firm gripping relation between the lower flange and the wall of the container holds the spool centralized within the container and the adhesive free from contact with the inner wall of the container.

It is obvious that minor changes in the details of construction and the arrangement of the parts may be made without departing from the spirit of the invention as set forth in the appended claim.

Having thus fully described my invention, what

I claim as new and desire to secure by Letters Patent, is:—

The combination of a spool including a hollow metal core, metal end flanges attached to said core, a cylindrical container for said spool, said container being rolled inwardly at the lower end thereof for forming a stop shoulder and rolled outwardly at the upper end thereof to form a strengthening bead, the wall of said container adjacent said stop shoulder and spaced therefrom having inwardly projecting spaced inclined ribs, the outer flange of said spool being extended so as to overlie the wall of the container and shaped to provide a recess adapted to receive the outturned bead on the container, the inner flange of said spool being shaped to provide spaced lugs adapted to pass between the inclined ribs on the container body for drawing said outer flange into contact with the bead on the container body, said inclined ribs at their upper ends being turned upward to direct the lugs beneath the same.

WILLIAM F. PUNTE.